US009654630B1

(12) United States Patent
Somani

(10) Patent No.: US 9,654,630 B1
(45) Date of Patent: *May 16, 2017

(54) AGENT OVERRIDE OF A CALL ANSWERING OUTCOME DETERMINATION OF AN OUTBOUND CALL IN A CONTACT CENTER

(71) Applicant: Noble Systems Corporation, Atlanta, GA (US)

(72) Inventor: Himanshu Somani, Atlanta, GA (US)

(73) Assignee: NOBLE SYSTEMS CORPORATION, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/884,887

(22) Filed: Oct. 16, 2015

Related U.S. Application Data

(63) Continuation of application No. 14/730,763, filed on Jun. 4, 2015, now Pat. No. 9,191,511.

(51) Int. Cl.
 H04M 3/00 (2006.01)
 H04M 3/51 (2006.01)
(52) U.S. Cl.
 CPC .................. *H04M 3/5158* (2013.01)
(58) Field of Classification Search
 CPC .................................................. H04M 3/5158
 USPC ................................ 370/259–271, 351–357; 379/265.01–266.1; 709/201–207, 709/217–248
 See application file for complete search history.

(56) References Cited

U.S. PATENT DOCUMENTS

| 5,796,791 | A | 8/1998 | Polcyn |
| 5,828,731 | A | 10/1998 | Szlam et al. |
| 8,184,789 | B2 | 5/2012 | Ryskamp |
| 8,953,754 | B1 | 2/2015 | Simon et al. |
| 2006/0056600 | A1 | 3/2006 | Merrow et al. |
| 2014/0044256 | A1 | 2/2014 | Zgardovski et al. |

OTHER PUBLICATIONS

Noble Systems Corporation, Composer X Ver. 1.2 User Manual, Jan. 22, 2013, 518 pages, Noble Systems Corporation, Atlanta, GA.
Noble Systems Corporation, Maestro 2010.1.1 Manual, vol. 4: IVR, Oct. 27, 2010, pp. 1-318, Noble Systems Corporation, Atlanta, GA.
Noble Systems Corporation, Maestro 2010.1.1 User Manual, vol. 2, Aug. 3, 2010, 416 pages, Noble Systems Corporation, Atlanta GA 30319.

(Continued)

*Primary Examiner* — Hemant Patel

(57) ABSTRACT

A dialer is configured to connect an agent to a call upon answer and present information to a computer workstation used by the agent as to whether the call was answered by a live person or an automatic call answering device ("ACAD"). An agent override timer is started allowing the agent to override the determination of whether a live person or ACAD answered the call. If an ACAD is reported to have answered the call and the agent does not provide an override indication or provides an override indication after the expiry of the agent override timer, then the agent may be disconnected from the call. If an agent override indication is received prior to the expiry of the agent override timer, then the agent is not disconnected from the call. This allows the agent to override an incorrect determination by the dialer as to an ACAD answering the call.

19 Claims, 13 Drawing Sheets

(56) References Cited

OTHER PUBLICATIONS

Noble Systems Corporation, Maestro 2010.1.1 Manual, vol. 3: Reports, Aug. 18, 2010, pp. 1-124, Noble Systems Corporation, Atlanta, GA.
Noble Systems Corporation, Maestro 2010.1.1 User Manual, vol. 1, Aug. 17, 2010, 454 pages, Noble Systems Corporation, Atlanta, GA.

| Row | Actual Outcome | System Reported Outcome | Typical System/Agent Response |
|---|---|---|---|
| 1 | Live Person | Live Person | Continue with call as normal – agent converses with called party. |
| 2 | Live Person | Automatic Call Answering Device | Agent overrides system reported indication, and system maintains connection between live person and agent. |
| 3 | Automatic Call Answering Device | Automatic Call Answering Device | Continue with call as system is configured for handling an answering machine. Typically agent is disconnected and the system may play announcement or terminate call. |
| 4 | Automatic Call Answering Device | Live Person | Agent overrides system reported indication, and system continues call according to rules defined for handling an answering machine. Typically agent is disconnected and the system may play announcement or terminate call. |

FIG. 2

AGENT OVERRIDE OF A CALL ANSWERING OUTCOME DETERMINATION OF AN OUTBOUND CALL IN A CONTACT CENTER

CROSS REFERENCE TO RELATED APPLICATIONS

This application is a continuation of U.S. patent application Ser. No. 14/730,763, filed on Jun. 4, 2015, now U.S. Pat. No. 9,151,511, the contents of which are incorporated by reference for all that it teaches.

FIELD OF INVENTION

The field of the invention generally pertains to contact centers, and specifically, processing related to handling an outgoing call based in part on whether the call has been answered by a live person or an automated call answering device.

BACKGROUND

Contact centers are used to contact individuals for different purposes, with voice calls being a common form of outbound communication. Voice calls can reach one of several outcomes, such as: being answered by a live person, not being answered, reaching busy, being answered by an answering machine or voice mail service, etc. Each of these call outcomes may warrant different treatment by the contact center. For example, some contact centers rely on automated equipment, such as a dialer, for originating the call, and upon the call being answered by a live person, the dialer will connect an available agent to the call. To maintain efficiency of agent resources, the contact center may connect an available agent to the call only when a live person has answered the outbound call. In other implementations, the contact center may terminate the call if the call is answered by an answering machine. Obviously, it would be undesirable to mis-categorize the call as being answered by an answering machine if it is in fact answered by a live person. In such cases, the dialer may terminate the call and the answering person would then hear nothing upon answering the call. Obviously, this would cause frustration on the part of the called party.

Thus, improved approaches are needed for handling a call originated by a contact center and distinguishing between the various outcomes a call may encounter. It is with respect to these considerations and others that the disclosure herein is presented.

BRIEF SUMMARY

Technologies are generally presented herein pertaining to systems, methods, and non-transitory computer readable medium for a dialer to originate a call, detect that the call has been answered, connect an agent in response to detecting the call was answered, and analyze audio on the call to determine whether the call was answered by a live person or an automatic call answering device ("ACAD"). Further, if the call is determined to have been answered by an ACAD, an agent override timer may be started, an indication may be provided to a computer used by an agent reporting an ACAD was detected, and the connection may be maintained to the agent in response to receiving an agent override indication indicating that the call was in fact answered by a live person.

In other embodiments, if the call is determined to have been answered by a live person, the agent override timer may be started, an indication may be provided to the computer used by the agent that a live person was detected, and the agent may be disconnected from the call in response to receiving an agent override indication indicating the call was in fact answered by an ACAD.

The subject matter disclosed herein may be implemented as a computer-controlled apparatus, a computer process, a computing system, or as an article of manufacture such as a non-transitory computer readable storage medium. These and various other features will be apparent from the following Detailed Description and the associated drawings.

This Summary is provided to exemplify concepts in a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE DRAWINGS

Reference will now be made to the accompanying drawings, which are not necessarily drawn to scale, and wherein:

FIG. 2 illustrates a table of the various combinations of actual and reported call answering outcomes along with potential associated agent actions.

DETAILED DESCRIPTION

Figure 1:
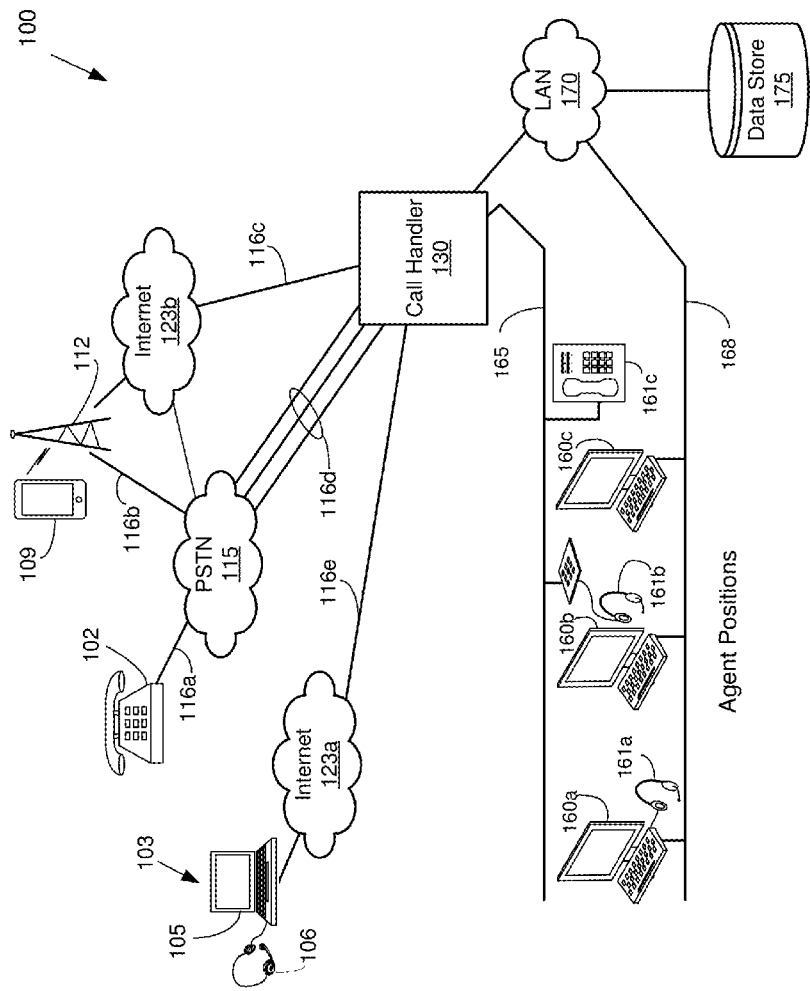
FIG. 1 illustrates one embodiment of a contact center which may employ the concepts and technologies disclosed herein.

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. As will be evident, there are a number of variations on the embodiments disclosed herein, but which are based on similar concepts and goals. Like numbers in the drawings refer to like elements throughout.

GLOSSARY

The following terms are to be given the following meanings in this specification, when used in the appropriate context. Any examples included in a definition are not intended to be exclusive or limiting, but merely illustrative.

Agent Override—an action, such as input from an agent, that overrides the determination of the call answering outcome reported by a dialer to that agent.

Agent Override Timer—a timer that while running allows an agent override input to be processed. Once the agent override timer has expired, agent override input will not be substantively processed, but effectively ignored.

Automatic Call Answering Device ("ACAD")—a device configured to automatically answer a voice call offered to an interface to provide a recorded greeting and record a message. This term includes a category of premise-based answering machine equipment, which are typically owned and operated by the person associated with the telephone number dialed. This term also includes a category of network-based equipment, which is typically owned and operated by a service provider that provides a service commonly called "voice mail service." Both forms of equipment/service are included within the scope of the term ACAD.

Call—a voice-based telephone call. For purposes of this application, the term "call" in the claims does not encompass short message service ("SMS") text messages.

Call Answering Outcome ("CAO")—the outcome of an outbound call by a dialer that is answered. The dialer may make a determination of whether the call is answered by a live person or an automatic call answering device.

Call Answering Outcome Determination ("CAOD")—a determination as to the outcome of a voice call that is answered, which includes making a determination of whether the call is answered by a live person or an automatic call answering device.

Call Answering Outcome Determination Module ("CAOD Module")—the module that provides the call answering outcome determination.

Call Outcome—the outcome of a call when it is offered to the remote interface associated with the called telephone number. The call outcome includes encountering various "no-answer outcomes" (such as busy or no-answer) and various "answered outcomes". Thus, a call answering outcome ("CAO") is a subset of the various possible call outcomes, which includes no-answer outcomes.

Confirmatory Indication—input provided by an agent indicating a confirmation of the dialer's reported call answering outcome. The confirmatory indication typically confirms that either a live person or an ACAD answered.

Dialer—a call handler in a contact center configured to originate calls on behalf of a plurality of agents working in the contact center. The dialer may report the call answering outcome to an agent on whose behalf the call was originated.

Live Person—in the context of answering a voice call, a live person is a human being that answers the call (as opposed to an ACAD).

Override Indication—input provided by an agent indicating an override of the dialer's reporting of the call answering outcome. The override indication typically indicates that either a live person or an ACAD has answered the call, which is in contradiction to the call answering outcome as reported by the dialer.

Remote Interface—the interface of the called party with their corresponding voice service provider. The remote interface is associated with a telephone number and may be based on various technologies. It is at the remote interface that the call may be answered, which may be detected by the dialer and reported as a call answering outcome.

Workstation—one or more devices used by an agent in a contact center. Typically, one of the devices includes a computer configured to manage calls processed by a call handler. The workstation may also comprise a voice capability, such as in the form of a so-called soft phone, which is a telephone function implemented using the computer. The workstation may present information to the agent about a call answering outcome and may receive an agent provided input to confirm or override such call answering outcome indication.

FIG. 1: Contact Center Architecture Overview

FIG. 1 shows one embodiment of a contact center architecture 100 illustrating the various technologies and components that may be involved when practicing the principles and concepts of the invention. The contact center shown in FIG. 1 may process voice calls that are inbound-only, outbound-only, or a combination of both (sometimes referred to as a "blended" contact center). For purposes of this disclosure, the focus is primarily on outbound calls or communications from the contact center because the purpose is to ascertain the answering outcome of a call that originated from the contact center to a remote interface of the called party. In some instances, the contact center may be referred to as a call center, and this may also be used when referring primarily to the context of handling voice calls in the contact center. Although many aspects of the contact center's operation are disclosed in the context of voice calls, in various embodiments, the contact center may process other forms of communication such as, facsimiles, emails, text messages such as Instant Messages or Short Message Service ("SMS") messages, video calls, and chat messages. However, for purposes of this invention, the reference to calls herein are voice calls.

Since the contact center may handle calls originating from a calling party, or initiated to a called party, the term "party" or "remote party" without any further qualification, refers to a person associated with a call handled by the contact center, where the call is either received from, or placed to, the party. Depending on the embodiment, outbound voice calls may originate to the called party that uses a variety of different phone types. For instance, the called party may receive a call at a conventional analog telephone 102 connected to a public switched telephone network ("PSTN") 115 using an analog plain old telephone service ("POTS") line 116a. The call may be routed by the PSTN 115 and may comprise various types of facilities 116d, including, but not limited to: T1 trunks, SONET based fiber optic networks, ATM networks, IP-based facilities, etc. Various types of routers, switches, bridges, gateways, and other types of equipment or protocols may be involved in the processing of the calls.

Outbound communications may also be directed from the call handler 130 to the individual's smart phone device 109, but the remote party's device could also be a mobile phone, tablet, or other mobile device, which wirelessly communicates with a mobile service provider ("MSP") 112. The voice calls may be routed to the PSTN 115 using an integrated services digital network ("ISDN") interface 116*b* or other types of interfaces that are well known to those skilled in the art. The ISDN interface may be a Primary Rate Interface ("PRI"), which comprises 24 channels—one signaling or D channel, and 23 bearer or "B" channels. The ISDN protocol may interwork with the Signaling System No. 7 ("SS7") protocol as is well known by those skilled in the art, and may convey information as to why a call was unable to be offered to the remote interface. This information may be conveyed back to the call handler 130 using the ISDN protocol on the ISDN interface 116*d*.

In particular embodiments, the MSP 112 may also route calls as packetized voice, also referred to herein as voice-over-IP ("VoIP") to/from an Internet provider 123*b* using Internet-based protocols. For convenience, unless indicated otherwise, the term "trunk" refers to any type of facility 116*c*, 116*d*, or 116*e* providing communication to, or from, the contact center, regardless of the type of protocol or technology used. Specifically, a "trunk" is not limited to time-division multiplexing ("TDM") technology. Outbound communications calls may also be directed to a called party employing a so-called "IP phone," "VoIP phone," or "soft phone" 103. In one embodiment may comprise a computing device 105, such as a laptop, computing tablet, or other electronic device, which processes voice data and interfaces with a headphone/microphone combination, also referred to as a headset 106. The computing device 105 may in turn be connected to an Internet provider 123*a*. Those skilled in the art will recognize that a variety of protocols and facilities may be used to convey voice calls and a variety of VoIP phone embodiments.

In some embodiments, the call handler 130 may be a contact device such as a dialer (e.g., predictive dialer or other type of dialer) that is, a device used to originate outbound calls. The call may originate at a rate designed to meet various criteria, such as when agents are expected to be available. A predictive dialer is a type of dialer that may originate calls to multiple telephone numbers simultaneously, with the expectation that agents will be available to handle one or more of the calls that are answered. Other types of dialing methods or modes may be used, such as preview dialing. For this dialing method, information about an account is displayed to an agent to review and after the agent becomes familiar with the account status, the agent indicates to the dialer that the call may be originated to the account. In this way, when the called party answers the phone, the agent can interact with the called party in an effective way. In preview dialing, the agent may be connected to the call as soon as the call originates from the dialer. The call handler 130 may also originate a call and play an announcement, or connect the call to an interactive voice response system ("IVR," not shown) which plays the announcement. The call handler 130 may be a dialer that interfaces with a plurality of ISDN PRIs 116*d* to the PSTN 115.

In particular embodiments, the call handler 130 may be configured so that it attempts to establish communication with individuals using telephone numbers stored in a data store 175. A dialing list may be stored in the data store, wherein the dialing list comprises a record for each account or number that is to be dialed. For example, a first telephone number may be used and if no answer is encountered, then a second telephone number associated with the individual may be used. These may be in the same call record or in multiple call records. Once a call is answered, the call handler 130 may connect the call to an available agent by connecting the outbound call leg to the called party with another call leg that has been established to an available agent using contact center communication facilities 165. Other embodiments may connect the call to an IVR. Depending on the embodiment, the facilities 165 may be any suitable technology for conveying the call, including but not limited to a local area network ("LAN"), wide area network ("WAN"), ISDN, or conventional TDM circuits.

In other embodiments, the outbound call leg may be connected to a call leg established to the agent's phone using a local network 170 over facilities 168. The exact details typically depend in part on the technology used. For example, the facilities 165 may be, in one embodiment, analog or proprietary voice communication technology whereas the facilities 168 may be, e.g., SIP or digital oriented. As may be appreciated, there are various technologies and configurations that are possible.

An agent typically uses a computing device 160*a*-160*c*, such as a personal computer, and a voice device 161*a*-161*c*. The combination of computing device 160*a*-160*c* and voice device 161*a*-161*c* may be referred to as a "workstation." In many instances, the computing device also handles VoIP so that reference to the "computer workstation" or the "agent's computer" may refer to the computer processing device of the workstation, that may be closely integrated with handling voice as well. Thus, for these particular embodiments, the workstation can be assumed to have at least a data capability and may have a voice capability.

Depending on the embodiment, the interaction between the call handler 130 and agent computers 160*a*-160*c*, as well as other components, may involve using a local area network ("LAN") 170. In particular embodiments, when an agent is interacting with the called party, the agent may use their computer 160*a*-160*c* to further interact with other enterprise computing systems, which may provide account level information to the agent. Typically, when a dialer connects the agent to an outbound call leg, data may also be presented to the agent using the agent's computer using facility 168. This may provide information about the called party, such as their associated account related information. The dialer may also provide information to the computer used by the agent with information about the detected call answering outcome, e.g., whether the call was answered by a live person or an automatic call answering device.

Although a number of the above entities may be referred to as a "component," each may also be referred to in the art as a "computing device,", "module", "unit", "server", or "system", although these terms are not necessary equal in scope. A component may incorporate a local data store and/or interface with an external data store. Use of the word "server" does not necessarily require the component to interact in a formal web-based client-server arrangement with other components, although that may be the case. Further, the above components may be located remotely from (or co-located with) other components. Furthermore, one or more of the components may be implemented on a single processing device to perform the functions described herein. In addition, the contact center architecture 100 may be provided as a hosted solution, where the call processing functionality is provided as a communication or software service (a so-called "communication-as-a-service" ("CaaS") or "software-as-a-service" ("SaaS")) to a contact center operator. Thus, there is no requirement that the components identified above must be actually located in a contact center location or controlled by a contact center operator. In addition, depending on the embodiment, the agent positions may be remotely located from the other components of the contact center, sometimes referred to as a "virtual contact center." Those skilled in the art will recognize FIG. 1 represents one possible configuration of a contact center architecture 100, and variations are possible with respect to the protocols, facilities, components, technologies, and equipment used.

Service Concepts

Call centers originating calls to telephone numbers in a dialing list may encounter a variety of outcomes associated with the calls. A common outcome (and desirable outcome) is that a call is answered by a live person. Another common outcome is that the call is answered by an answering machine or forwarded to a voice mail service provider that answers the call. Typically when this occurs, the caller hears a pre-recorded greeting message recorded by the called party, and the caller is given the opportunity to leave a message. The greeting may be played by the answering machine or by the voice mail equipment.

Aside from the call being answered, the call may also encounter other outcomes, such as a "no-answer condition" which is when the phone rings without being answered. Another outcome may include the call encountering a busy condition, which may be indicated by providing a busy tone to the caller. Another outcome is that the call may encounter a service intercept. A service intercept is manifested by a pre-recorded message provided by the service provider (e.g., telephone service provider) indicating the number is out-of-service or is currently an unassigned number. In some cases, the announcement may be preceded by a sequence of three tones, sometimes referred as special intercept tones ("SIT"), which facilitate automated detection of one of several conditions. Other outcomes, such as a network busy condition, may be indicated by a so-called "fast busy" tone, which is similar to a regular busy tone, but with a faster cadence.

These various outcomes that an outgoing call may encounter are referred to herein as "call outcomes." A dialer in a contact center may be made aware of a call outcome in various ways. If a call is answered, a signaling message from the communications carrier may be sent to the dialer. This may depend on the particular communications protocol. If the call reaches a busy condition, in-band tones may be provided. Similarly, a signaling message and a corresponding parameter in that message may be sent by the communications carrier indicating this outcome. In short, the dialer may rely on various protocol messages, analysis of in-band tones or other mechanisms for determining the call outcome.

For example, the dialer may employ an ISDN primary rate interface to a communications carrier. The protocol used by the ISDN defines various messages and parameters that provide information as to the outgoing call. Specifically, when an outgoing call is answered, a "CONNECT" message may be received by the dialer, indicating that the call was answered by a remote party. If the call is not answered, other messages may be received with various cause codes indicating at various levels of detail, why the call was not answered. For example, a message may be returned indicating that the remote party is busy and does not have resources to accept the call.

In other embodiments, the dialer may employ a session initiated protocol ("SIP"), commonly used with Voice over Internet Protocol ("VoIP"). This is also a message based protocol for processing calls, and similar messages and parameters may be defined indicating the status of an outgoing call. In other embodiments, the dialer may employ T1 trunks to a telephone carrier, and in such cases another protocol format is used, although this format generally does not provide the level of granularity as, for example, ISDN interfaces. In such cases, some of the call outcomes may have to be detected by monitoring the in-band tones or signals to ascertain that the call has encountered a particular condition, e.g., a busy condition.

In many of the outcomes, the particular call outcomes encountered can be properly distinguished based on the in-band tones provided to the call originator. In-band refers to information conveyed on the voice channel, as opposed to information conveyed using a separate (out-of-band) channel. Typically, information conveyed out-of-band uses a digital message based protocol, and therefore is unambiguous. In certain circumstances, however, information conveyed in-band may be ambiguous. For example, information conveyed in-band may comprise audio information. Specifically, there are two call outcomes that can be difficult to distinguish, which the present invention is concerned with. These both involve outcomes when the call is answered, and hence are referred to "call answering outcomes," which are a subset of the possible call outcomes.

The two call answering outcomes that are difficult to distinguish involve a call being answered by a live person and a call being answered by an automated message handling device ("ACAD"). As used herein, an ACAD encompasses both a voice mail system and an answering machine. A voice mail system is a form of ACAD that is frequently operated by a service provider who owns the necessary equipment and who provides a voice mail service to the called party. An answering machine is another form of an ACAD that is owned and operated by the called party, and typically resides in the residence of the called party. The actual equipment of an answering machine may be a consumer electronics product whereas the voice mail system may be industrial electronics, with different specifications, capacities, etc. For example, the answering machine typically handles one telephone line whereas a voice mail system employed by a carrier may handle hundreds or thousands of telephone lines. However, as it is well known, both types of systems provide the technological capability of automatically answering a call, playing a greeting to the calling party, and allow a message to be left. Further, both allow the called party to subsequently retrieve and review their messages. For purposes of explaining the concept of distinguishing between a live person and an ACAD, the differences between the various ACAD equipment is not relevant.

In the contact center industry, the detection of ACAD equipment capability is frequently referred to as "answering machine detection" ("AMD") but it is understood in the contact center industry that reference to this term (AMD) encompasses detecting a call answered by either a premise-based answering machine or a service provider-based voice mail system. To avoid any confusion, the term "ACAD" is referred herein to make it clear that both types of equipment are encompassed.

An issue may arise when a contact center originates a call to a called party and the call is answered. The call may have been answered by a live person who may say, e.g., "hello." Or, the call may have been answered by an ACAD. Typically when an ACAD answers a call, a voice recording called a "greeting" is played, and it is not unusual for the greeting to begin with, e.g., "hello . . . " Typically, the ACAD greeting is longer than a greeting provided by a live person, but a live person may be in a noisy background which may be interpreted as further speech, and could be misinterpreted as an answering machine greeting. Thus, it may be difficult for the dialer to distinguish between the live person and the outgoing greeting provided by the ACAD. In other words, the dialer may incorrectly assess the call answering outcome. From the contact center perspective, assessing this correctly is important. Typically, the contact center will process outgoing calls differently depending on whether they are answered by a live person or an ACAD.

For example, if a live person answers, the contact center may connect an agent to the call, so that the agent can converse with the person. However, if an ACAD answers the phone, the contact center may end the call, or play a pre-recorded announcement that is recorded on the called party's ACAD. Thus, it is important for the dialer to be able to accurately assess the call answering outcome of a given call.

There are various indications that suggest whether the voice on an answered call is a live person or a greeting from an ACAD. A live person may simply say "hello" whereas a greeting on an ACAD may state "hello, this is John Doe. I am not here, so please leave a message." Thus, the duration of speech itself may be an indicator of whether the call is answered by a live person or an ACAD. There are other techniques known in the art that may be used for determining whether a live person or ACAD has answered the call. It is not uncommon for the accuracy of detecting an ACAD to be in the 90%-95% range. Some algorithms may be even have a higher accuracy.

However, regardless of the various techniques or algorithms used, there is always the possibility that the call answering processing module will erroneously determine the call answering outcome. In other words, 100% accuracy of determining the call answering outcome cannot be expected. Further, the accuracy is not quite as simple as quantifying this as a single number, as there are two different forms of errors that can be made in this context. First, the call answering outcome processing module may erroneously determine the call has been answered by a live person, when in fact, it has been answered by an ACAD. Or, the call answering outcome processing module may erroneously determine the call has been answered by an ACAD, when in fact, it has been answered by a live person. It is more precise to separately identify the accuracy for these situations. These types of errors are sometimes called "false-positives" in that the error falsely identifies the outcome as being an ACAD or a live person.

Figure 13:
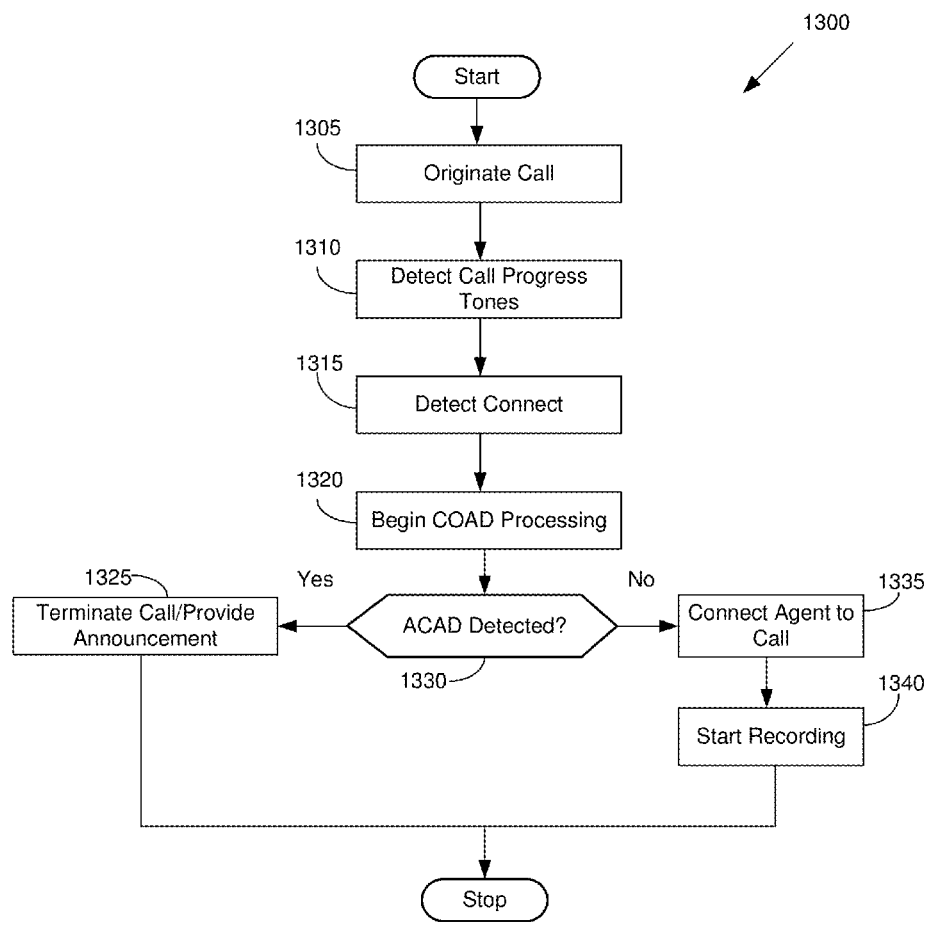
FIG. 13 illustrates one embodiment of a prior art process flow of a dialer processing an originating call based on the call answering outcome determination.

One embodiment found in the prior art of a process flow for a contact center handling these different call answering outcomes is shown in FIG. 13. FIG. 13 illustrates the process 1300 as beginning with originating a call in operation 1305 by the contact center. Depending on the particular technology involved, the dialer may detect various call progress tones in operation 1310. This may include detecting, e.g., ringing when the call is offered to the remote interface. In various embodiments, this step may involve monitoring for in-band tones, depending on how the ringing is provided in a particular embodiment. Assuming that the call is answered, a particular message in the call handling protocol may be provided to the dialer in operation 1315. At this point, the contact center knows that the outbound call has been answered. This is also sometimes referred to as a "connect" as the result of the call being answered is that a connection is established between the two parties.

The dialer may then begin the CAOD process in operation 1320. This may take typically between 1-5 seconds to make a determination. If the determination is that an answering machine is detected in operation 1330, then the process continues to either terminate the call or provide an announcement (depending on how the dialer is configured) in operation 1325. The process is then completed for that outgoing call. Typically, the agent is not connected when an ACAD is detected. Although the process may be referred to as "ACAD detection", the result of an answered call that does not involve an ACAD is presumed to be a live person. Thus, this process could be alternatively referred to as "live person detection." Further, since determining whether an ACAD or live person answers the call, this could also be referred to as the call answering outcome determination ("CAOD").

If, however, the CAOD process in operation 1330 does not detect an ACAD (which means that a live person has been detected), then the agent is connected to the call in operation 1335. Further, if the call is to be recorded, then the recording process may start in operation 1340. The process is then completed for that outgoing call.

It is evident that if an error is made in detecting the ACAD in operation 1330, adverse consequences may occur. Specifically, if an answering machine is incorrectly detected whereas in actuality a live person answered the call, the call will be terminated (or a prerecorded announcement provided) and the live person will hear nothing (or the prerecorded announcement). This is undesirable for various reasons, including that it may be prohibited by regulation. On the other hand, if the CAOD process in operation 1330 incorrectly detects a live person whereas in actuality it is an answering machine, then the agent will be connected to an answering machine. The agent's time is then poorly utilized. Further, even when the correct determination is made in operation 1330, then the call is not recorded until the agent is connected. This results in not recording the live person's original greeting. For various reasons, it may be desirable to record the called party's initial greeting when a live person answers the call.

For many contact center operators, there is a desire to maintain a high level of customer focus such that it is very important to avoid having a live person answer a call only to have that call terminated by the contact center. One approach to avoid this situation is to employ preview dialing, where the agent is presented with account information and manually signals that the call is to be dialed. In some embodiments, the agent is connected to the call immediately upon the call being originated. However this requires the agent to be connected while the call is ringing. In such situations, this can adversely reduce the agent's efficiency to require the agent to wait while the call is ringing.

Furthermore, the prior art does not provide any intrinsic methods for verifying whether an error has occurred in the CAOD process shown in operation 1330. If the error involves incorrectly classifying a live person as an answering machine, the call may be terminated and there is no easy method to verify whether this was correct. The traditional approach is to manually listen to calls as they occur, or to record the calls as they progress, and manually verify whether each call was properly handled. This is time consuming and inefficient.

In one embodiment of the present invention, the agent is connected to the call once the connection is established. Further, the agent is provided an indication of whether a live person or ACAD is detected. This allows the agent to verify, and if necessary, override the determination of the CAOD result. This allows the agent to "rescue" a call that would otherwise be incorrectly handled by the dialer. This can be illustrated with the aid of the table shown in FIG. 2.

Possible Combinations of Actual Versus Reported Call Answering Outcomes

Turning to FIG. 2, a chart 200 illustrates the appropriate responses with respect to actual outcomes versus system reported outcomes. The chart 200 also identifies what options may be presented to an agent for handling various situations. From the chart, a first column 205 defines a row number, a second column 210 defines the actual call answering outcome, a third column indicates 215 what is reported by the CAOD process, and the fourth column 220 indicates an appropriate system/agent response under the circumstances.

Turning to row 1, if the call is actually answered by a live person and the system reports the call answering outcome as being answered by a live person, then no discrepancy exists. Reference to the call answering outcome as being "reported" or "detected" refers to the outcome as determined by the dialer. In other words, the dialer "reports" the call answering outcome. The system (e.g., dialer) should process the call as programmed when a live person answers the call, which typically is to connect the call to an agent so that the agent may converse with the live person.

Turning to row 2, a discrepancy is encountered when the call is actually answered by a live person but the system reports the call as being answered by an answering machine, or more accurately, an ACAD. Normally, under the prior art call flow as shown in FIG. 13, such a discrepancy would result in terminating the call that was answered by the live person. However, in one embodiment of the present invention, the agent is connected to the call after the call is answered (e.g., a connection is detected). In this case, the agent will hear the called party answering the phone, providing an initial greeting, and the agent will likely be able to quickly discern that a live person has answered the phone. The agent may be present with information from the dialer indicating that the dialer thinks an ACAD has been detected. If so, the agent will then override this determination and "force" the dialer to treat the call as if a live person was detected answering the call. In essence, the agent's indication will "override" the determination as reported by the dialer, with respect to the call answering outcome.

Thus, for row 2, the appropriate action is for the agent to override the system's CAOD and have the system maintain the connection between the live person and the agent. The dialer should also note that a discrepancy was reported based on the agent overriding the CAOD. In essence, the agent has "recovered" a call that would otherwise have been terminated, and instead, the connection is maintained and the agent can converse with the called party.

In the third row, there is no discrepancy. An ACAD, such as an answering machine, has answered the call and the system reports that an ACAD is detected. Presuming that the agent is connected to the call once a connection is established, the agent will likely come to the same conclusion that an ACAD has answered the call and will not override the call answering outcome reported by the dialer. Since the system response typically is to terminate the call upon reaching an ACAD, the agent may be disconnected from the call and made available for another call being originated by the dialer.

The fourth row illustrates another discrepancy. In this case, an ACAD has actually answered the call, but the system reports the call answering outcome as a live person. As with every call, the agent is connected to the call as soon as the call is answered. The system reports to the agent that a live person has been detected and will maintain the call with the agent. However, the agent will presumably know that the call has not been answered by a live person and will indicate an override indication. The agent can then override the system's CAOD by indicating the call was answered by an ACAD. The system then disconnects the agent and treats the call accordingly. As noted earlier, typically, the dialer terminates the call if it determines the call was answered by an ACAD.

By connecting the agent to each call when answered, the agent is able to ascertain for themselves whether a live person or an ACAD has answered the call. In essence, the agent is mentally performing an ACAD answering analysis in parallel with the dialer. The dialer reports its determination to the agent, and the agent can then compare their own determination with that reported by the dialer. If the dialer has incorrectly reported the call answering outcome, the agent can override this. Typically, the agent would then select a function key on their computer workstation and the dialer would respond accordingly. Specifically, if the agent has indicated the call involves a live agent, then the dialer would maintain the call, as opposed to terminating the call or playing an announcement. If the agent has indicated the call involves an ACAD, then the dialer would release the agent and terminate the call (or play an announcement, if so configured).

In both cases, the dialer would note the discrepancy in the reported call answering outcome when the agent indicates an override. This allows ready review of the statistics to ascertain how frequently the dialer mistakenly evaluates the call answering outcome. It is then readily possible to compare the number of overrides (e.g., errors in determining the call answering outcome) as a percentage to the overall number of calls. Further, it is possible to readily report the specific percentage of incorrect determinations of reporting the calls as having been answered by a live person as well as the specific percentage of calls incorrectly determined to be answered by an ACAD. This allows an effective mechanism to measure the effectiveness of the ACAD detection mechanism. These statistics can be made available in reports to an administrator or as real-time indicators on a supervisor's dashboard.

Call Answering Outcome Determination Process Flow

The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

Figure 3:
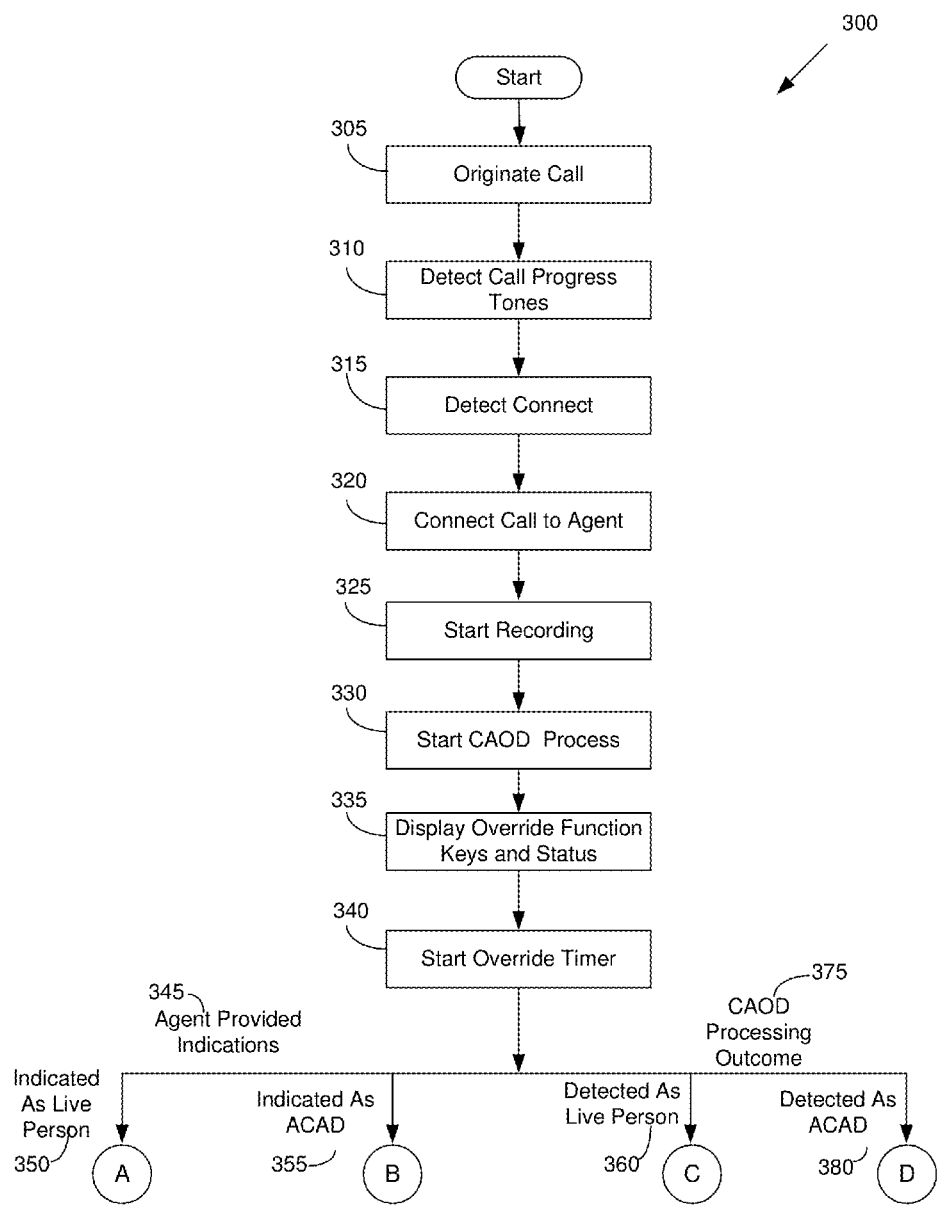
FIG. 3 illustrates one embodiment of a process flow associated with processing an originating call to a remote party.

FIG. 3 illustrates one embodiment of a process flow 300 that may involve the call answering outcome determination module. Because this module is typically found in the dialer, reference to the "dialer" may be made in lieu of the call answering outcome determination module, though other embodiments may provide for the call answering outcome determination module separate from the dialer. In other embodiments, some of the steps shown in process flow 300 may be performed by a dialer and other steps in separate call answering outcome determination module.

The process flow begins with the dialer originating a call in operation 305. In certain embodiments, a backward voice channel may be "cut through" (e.g., connected) to the dialer allowing any remotely generated audio (such as ringing) to be conveyed back to the dialer. For example, in some technologies, a busy signal, ringing, etc. may be provided in-band to the dialer by a communications carrier. This is reflected in operation 310 where the dialer may monitor and/or detect any call progress tones. In other embodiments, this information may be conveyed by a signaling message. Assuming the call will be answered, the call progress tones provided to the dialer would be a ringing cadence. Once the call is answered, a connect event will be detected in operation 315. In various embodiments, the call connect may be detected by the presence of a corresponding message on the interface to the dialer, depending on the technology and protocol used.

In response to detecting the originating call being connected (e.g., being answered), the dialer will initiate several tasks, which can occur in various order. These tasks include connecting an agent to the call, recording the call, and starting the CAOD process. In the example shown in FIG. 3, the first operation shown is connecting the agent to the call in operation 320. Consequently, the agent will be able to hear the initial audio provided by the remote party (whether it is provided by a live person or an ACAD).

In addition, call recording may be initiated as indicated in operation 325. Not all embodiments require the call to be recorded. Call recording may occur by streaming one stream or two streams (one for the agent's speech and another for the called party's speech) to a memory or other type of storage device. By initiating recording in response to the call being answered, the recording will capture the initial greeting provided by the remote party (whether it is provided by a live person or an ACAD).

Finally, the CAOD process is initiated in response to detecting the call was answered in operation 330. This process detects the call answering outcome, i.e., whether an ACAD or live person is present. In some embodiments, the CAOD process may be a subset of the overall call outcome determination process, since detecting the ACAD is one possible answering outcome, which in turn is a subset of all possible call outcomes. However, the concepts and technologies herein largely are concerned with determining whether a live person or ACAD has answered the call, as opposed to determining the other possible call outcomes.

The next two operations (operations 335 and 340) are shown as distinct from the CAOD process, but could be considered as part of the CAOD process. Once the dialer begins the process of determining whether a live person or ACAD is present, the dialer provides information to the agent indicating the current status. Initially, the status information displayed to the agent in operation 335 may indicate that a determination has not yet been made. In other embodiments, the status information is only displayed once a determination is made.

Various function keys may be presented to the agent's computer workstation screen, allowing the agent to override or confirm what the dialer has determined as having answered the call. Finally, an override timer is started in operation 340. In other embodiments, this timer may be started after the CAOD process has produced an initial determination.

From a time perspective, there may be a few seconds between when the call is originated in operation 305 to when a call progress tone is detected in operation 310. The time between ringing (operation 310) and detecting connect (in operation 315) depends on how long the remote party lets their phone ring before answering. A live person may pick up the phone immediately, or after several ring cycles. An ACAD is typically programmed to pick up the call after a predetermined number of ring cycles. Thus, the operations 325-340 typically occur in quick succession.

At this point, several events may occur, which are shown as events labeled A 350, B 355, C 360, and D 380. Two events are agent provided indications 345. These reflect the agent indicating via their computer a determination of who/what answered the call. In one case, the agent can indicate the call was answered by a human 350. In another case, the agent can indicate the call was answered by an ACAD 355. The agent can indicate one or the other, but not both. The other two possibilities are the reporting of the CAOD process 375, which may report a live person was detected 360 or an ACAD was detected 380.

Returning to the agent provided indications 345, typically, the agent indicates one of these for the purpose of either preempting a determination that will be reported by the dialer (i.e., CAOD processing module in the dialer) or overriding a determination that has been reported by the dialer. For example, assuming the call is answered and the agent quickly realizes that a human has answered, the agent can indicate to the dialer that a human has answered before the CAOD process has made a determination. In other cases, the CAOD process may have reported an incorrect determination, and the agent indicates an override by indicating a human has answered the call. It is also possible that the CAOD process could report that a human answered the call and the agent could confirm this, but this input is, in effect, ignored by the dialer, since no change in call processing occurs.

Similarly, the agent could indicate to the dialer that the call was answered by an ACAD prior to a determination of the call answering outcome being made by the dialer or to override a report by the dialer that the call was answered by a human. It is possible that the CAOD process could take several seconds (in some cases up to 5 seconds) to determine whether the call was answered by a live person or an ACAD. The agent may know the call has been answered by an ACAD (or a live person) faster than the CAOD process may be able to discern this, and thus the agent can indicate the outcome to preempt the dialer's CAOD process.

Process Flow "A"—Agent Indicates the Call is Answered by a Live Person

Figure 4:
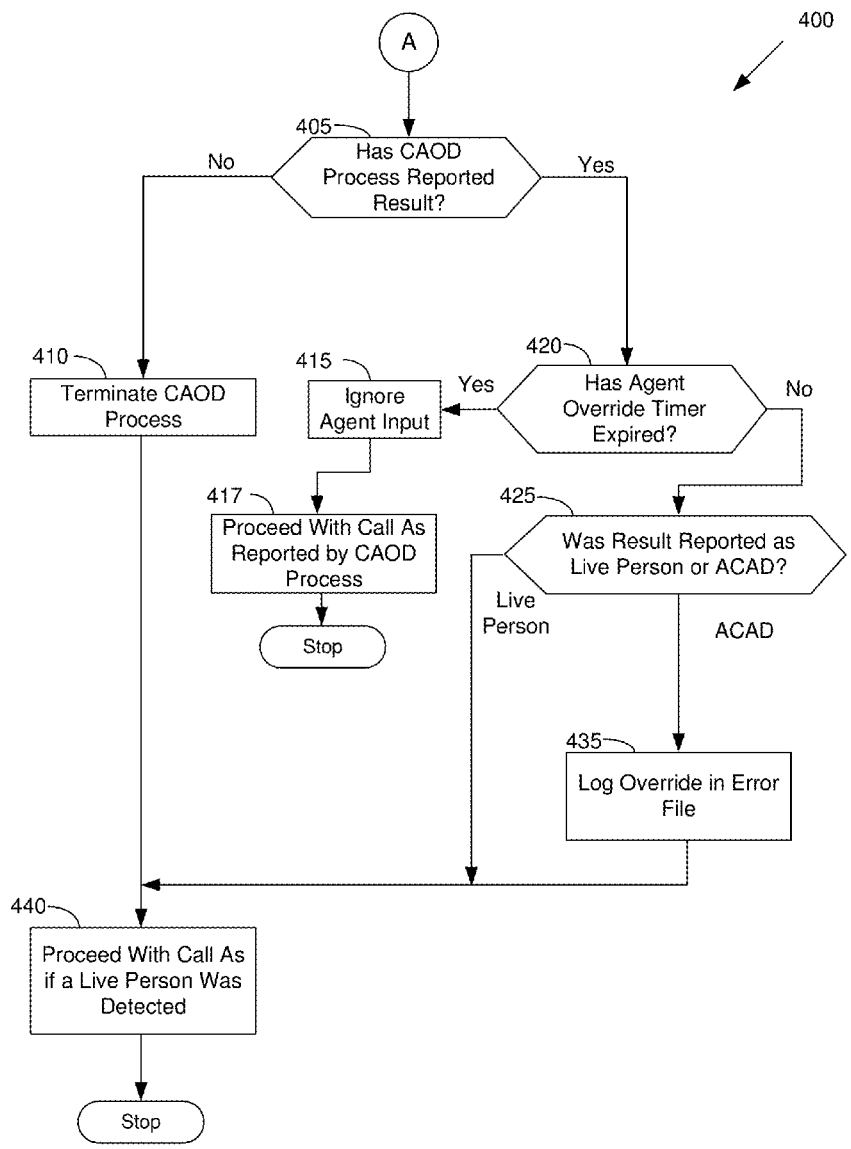
FIG. 4 illustrates one embodiment of a process flow associated with the agent indicating the call has been answered by a live person.

The process flow 400 shown in FIG. 4 illustrates one embodiment related to the agent indicating the call has been answered by a live person. Recall that the agent is connected to the call as soon as the call is answered and the agent may have various screen functions presented to them by the dialer when the call is connected. These functions may indicate a current status of detection and allow the agent to indicate (either by pre-empting, overriding, or confirming) whether a live person or answering machine has answered the call.

Turning to FIG. 4, the process begins with determining whether the CAOD process has reported its result in operation 405. If the CAOD process has not yet determined whether an ACAD has answered the call, then the agent input effectively terminates the CAOD process in operation 410. In essence, the agent is pre-empting the CAOD reporting results by indicating that a live person has answered the call, and so the CAOD process need not complete its processing. Because the agent has indicated the call was answered by a live person, the call proceeds as if the CAOD process had detected a live human in operation 440. Typically, this means that the connection between the agent and remote party is maintained.

On the other hand, if the CAOD process had reported a result, the process flow continues to operation 420 where a test is made to see if the agent override timer has expired. Recall from above that if the agent indicates a live person has answered the call before the CAOD process completes its determination, then the agent is pre-empting the CAOD process' outcome. On the other hand, if the agent indicates a live person has answered the call after the CAOD process reports its determination that an ACAD has answered the call, then the agent may be overriding the CAOD process' outcome. Similarly, if the agent indicates an input consistent with the reported outcome of the CAOD process, the agent's input confirms the result. Only if the agent's input is different from the CAOD process' result is the agent's input overriding the CAOD process.

The agent override timer defines a time period in which the agent can provide input that will override the CAOD process result. Since overriding the CAOD process result impacts how the call will proceed, there is a limited time in which the processing of the call may be changed. For example, if the CAOD process determines an answering machine has answered the call and the dialer is configured to play an announcement, then once the announcement is started, it may not be practical to then override the CAOD process determination. Once the announcement is started, the agent is usually dropped from the call and it is too late to override the CAOD process result and prevent playing the announcement (as it has already started). Hence, an agent override timer defines a time period, typically within a few seconds of the CAOD process making its determination, during which the agent can override that determination.

Turning back to FIG. 4, if the agent timer override has expired in operation 420, then the agent input is effectively ignored in operation 415. The process then continues to operation 417, where the call proceeds as reported by the CAOD process. If the CAOD process has reported the call as being answered by a live person, then agent's input is a confirmation of that determination, but because it was entered after the agent override timer expired, the agent's input is ignored. The call is processed based on the determination of being answered by a live person. Similarly, if the CAOD process reported the call as being answered by an ACAD, then the agent's attempt to override that determination is still ignored based on the override timer expiring, and the call is processed based on the CAOD process reporting an ACAD answered the call.

If the agent override timer has not expired in operation 420, then a test determines whether the agent's input merely confirms the CAOD process' result or overrides it in operation 425. Specifically, if the CAOD process reports a live person answered the call and the agent's input was that a live person answered the call, then the agent's input merely confirms what the CAOD process has reported and the call proceeds as if a live person answered the call in operation 440. On the other hand, if the CAOD process had reported an ACAD answered the call, then the agent's input is an override. This override is logged in an error file in operation 435, which allows analyzing statistics of the accuracy of the CAOD process. The call then proceeds in operation 440 as if a live person answered the call.

Process Flow "B"—Agent Indicates Call is Answered by an ACAD

Figure 5:
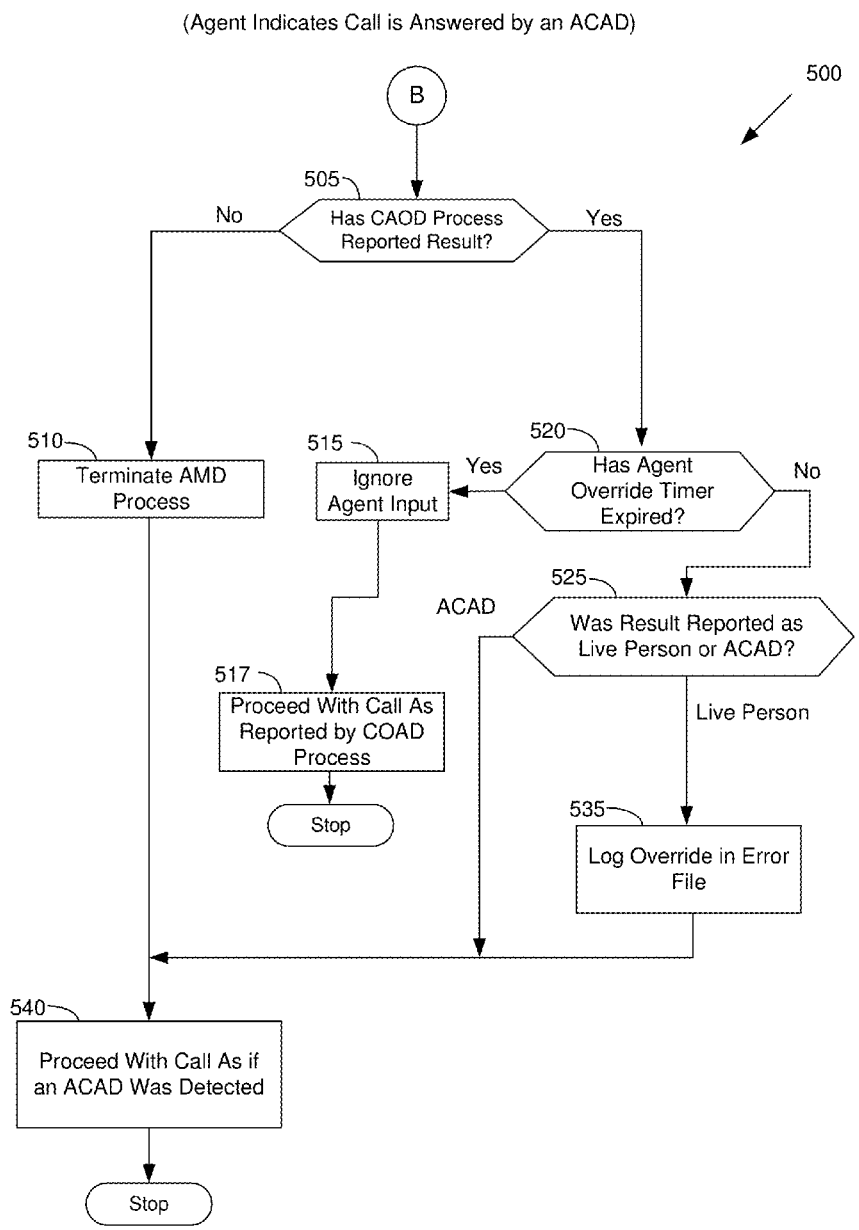
FIG. 5 illustrates one embodiment of a process flow associated with the agent indicating the call has been answered by an answering machine.

FIG. 5 is similar in respects to FIG. 4, except that in this case the agent is indicating the call was answered by an ACAD. The process flow 500 begins with first determining whether the CAOD process has reported its result in operation 505. If not, then the agent's input is pre-empting the CAOD process result and terminates the CAOD process in operation 510. The call proceeds as if the CAOD process reported an ACAD as answering the call in operation 540.

If the CAOD process had reported its result in operation 505, then the a test is made to see if the timer has expired in operation 520, then the agent's input is too late and it is ignored in operation 515. The call then proceeds in accordance with the result reported by the CAOD process in operation 517.

If the agent override timer has not expired in operation 520, then a test is made in operation 525 to determine whether the agent's input is merely confirming the result of the CAOD process or overriding it. If the CAOD process reported an ACAD had answered the call, then the agent's input merely confirms the result and the process continues to operation 540, where the call is processed accordingly. If the CAOD process had reported a live person in operation 525, then the agent's input is overriding it. The discrepancy is logged in operation 535 and the call then proceeds as if an ACAD had been detected.

Figure 6:
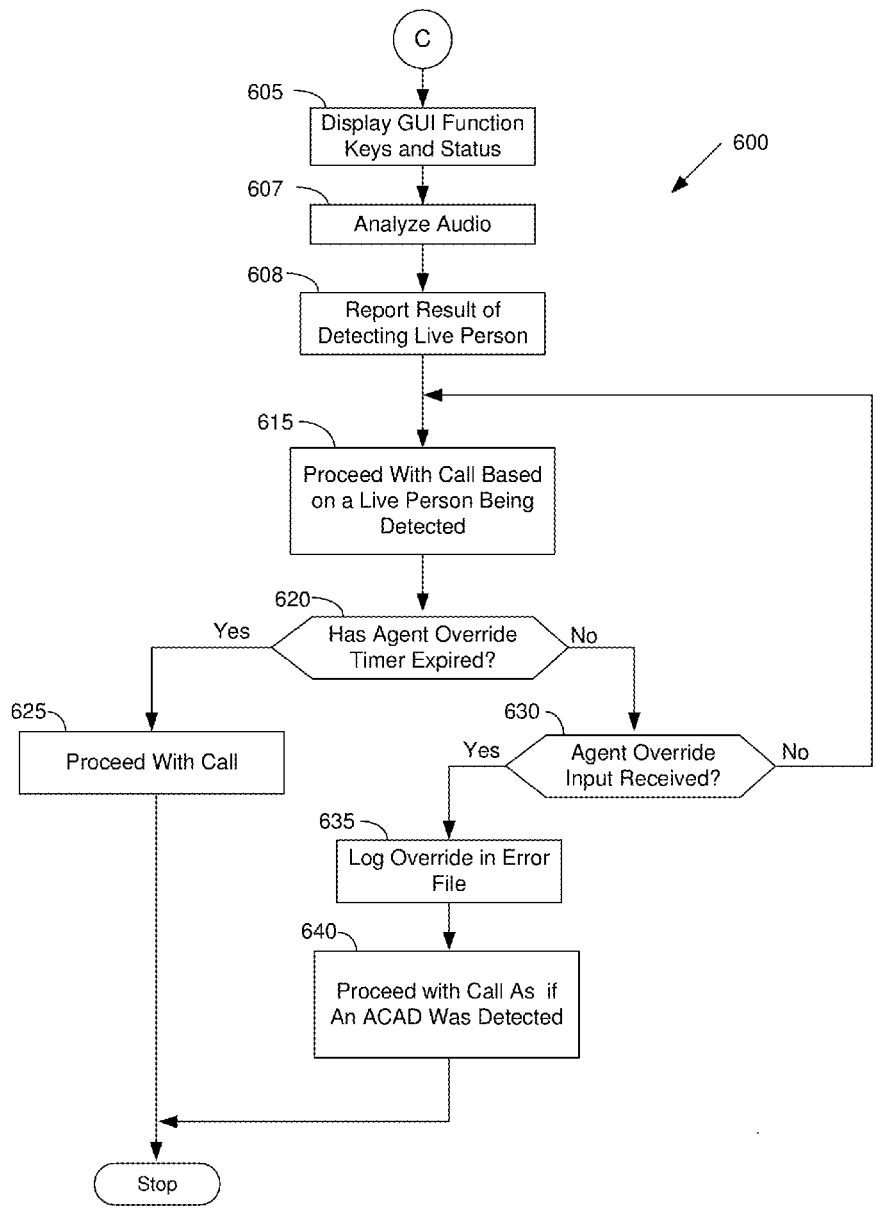
FIG. 6 illustrates one embodiment of a process flow associated with the dialer proceeding with the call after determining the call has been answered by a live person.

Process Flow "C"—Call Answering Outcome Determination Module Reports a Live Person Answered the Call Turning to FIG. 6, an embodiment of the CAOD process flow 600 is shown that reflects the CAOD process reporting that it has detected a live person has answered the call. When the CAOD process begins, it may display to the agent various related function keys and status information in operation 605. The status information may indicate whether a determination has been made, what the determination is once it has been made, and a processing result of processing any agent inputs. For example, an input from an agent may be construed as pre-empting, overriding, or confirming the result reported by the CAOD process. The agent may be presented with information as to how the input was treated. Various embodiments of these visual elements are illustrated later.

The CAOD process uses existing algorithms to analyze the audio in operation 607 for the purpose of detecting whether a live person or an ACAD has answered the call. Various algorithms known in the art may be used. Once this is known, the result is reported to the agent in operation 608. This may involve updating or modifying the previously displayed visual elements to the agent. For example, a status indication may reflect the call answering outcome by changing a status indicator from "Unknown" to "Live Person." Further, once the result is reported, various functions keys may be presented or updated. For example, once a result is reported, an "override" function may be presented to the agent on their computer display. At this point, the call proceeds as if a live person was detected in operation 615. Typically, this involves maintaining the connection between the agent and the remote party.

The CAOD process then monitors the agent override timer in operation 620. If it expires without any agent input, then the call may proceed in operation 625, based on the call being answered by a live person. On the other hand, if an agent override input is received before the timer expires, as shown in operation 630, then the information is logged in operation 635 and the call proceeds as if an ACAD was reported in operation 640.

Returning to operation 630, if the agent merely confirms the result or does not provide any input, then the process loops back to operation 615 where the call proceeds as if a live person was reported and this continues until the agent override timer expires in operation 620. Once the timer expires, the call continues to be processed as if a live person answered the call, which is to maintain the connection with the agent (until the agent or remote party terminates the call).

Figure 7:
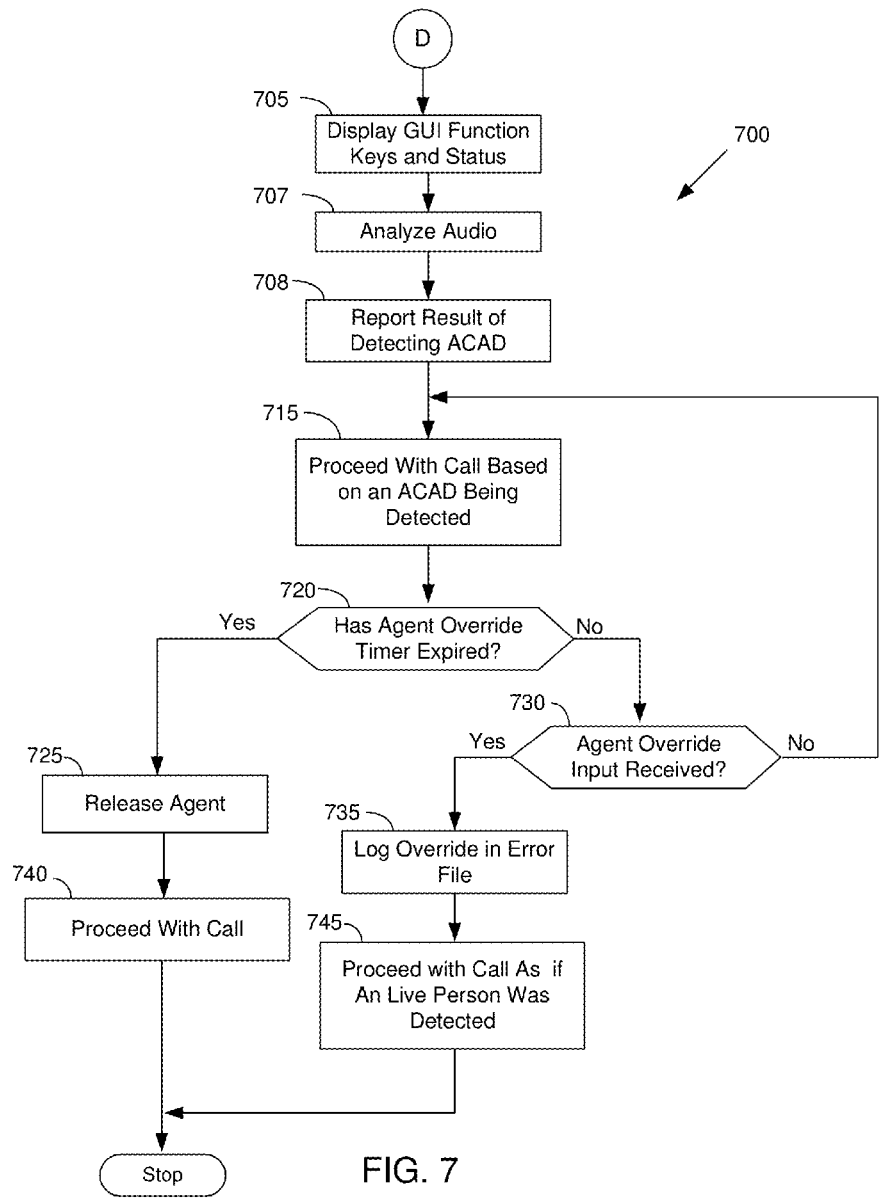
FIG. 7 illustrates one embodiment of a process flow associated with the dialer proceeding with the call after determining the call has been answered by an answering machine.

Process Flow "D"—Call Answering Outcome Determination Module Reports an ACAD Answered the Call Turning to FIG. 7, another embodiment of the CAOD process flow 700 is shown reflecting that is had detected an ACAD. When the CAOD process begins, it may display various related function keys and status in operation 705. It analyzes the audio in operation 707 and when a result is determined, this is reported in operation 708. In this embodiment, an ACAD is reported as having answered the call. At this point the call then proceeds in operation 715 as is defined when an ACAD is detected.

Typically, if an ACAD is detected, the agent is released from the call. This cannot be done immediately, because it would not allow time for the agent to override this determination. Hence, the need for the override timer. Once an ACAD is detected, the call to the remote party may be released after the agent override timer expires. In some embodiments, an announcement may be provided. Typically, an announcement system is used to provide the announcement, and thus, the call is transferred to an announcement system or an announcement system is attached to the call and recorded by the ACAD. In some embodiments, the agent may provide a personalized announcement to the ACAD. If so configured, then the agent is not released from the call. However, there is a limited amount of time for the agent to override the call processing that occurs when an ACAD is reported, which is defined by the agent override timer.

If the timer does expire in operation 720, then the agent may be released in operation 725 because the call proceeds in accordance with an ACAD being detected, and typically the agent is release from the call in such circumstances. The call proceeds as is defined for when an ACAD is reported in operation 740. If the timer has not expired in operation 720, then input from the agent is monitored. If the agent does not indicate an override (e.g., does not provide any input or provides a confirmatory input), then the process loops back to operation 715 where the call proceeds in according with an ACAD answering the call. If, however, agent input is received before the agent override timer expires, then the process flow continues from operation 730 to operation 735 where a log entry is made into an error file. This allows collection and analysis of statistics of how frequently the CAOD process is overridden. Next, the call proceeds as if a live person was detected. Typically, this means that the connection to the remote party and agent is maintained.

Process Flow for when an ACAD is Detected

Figure 8:
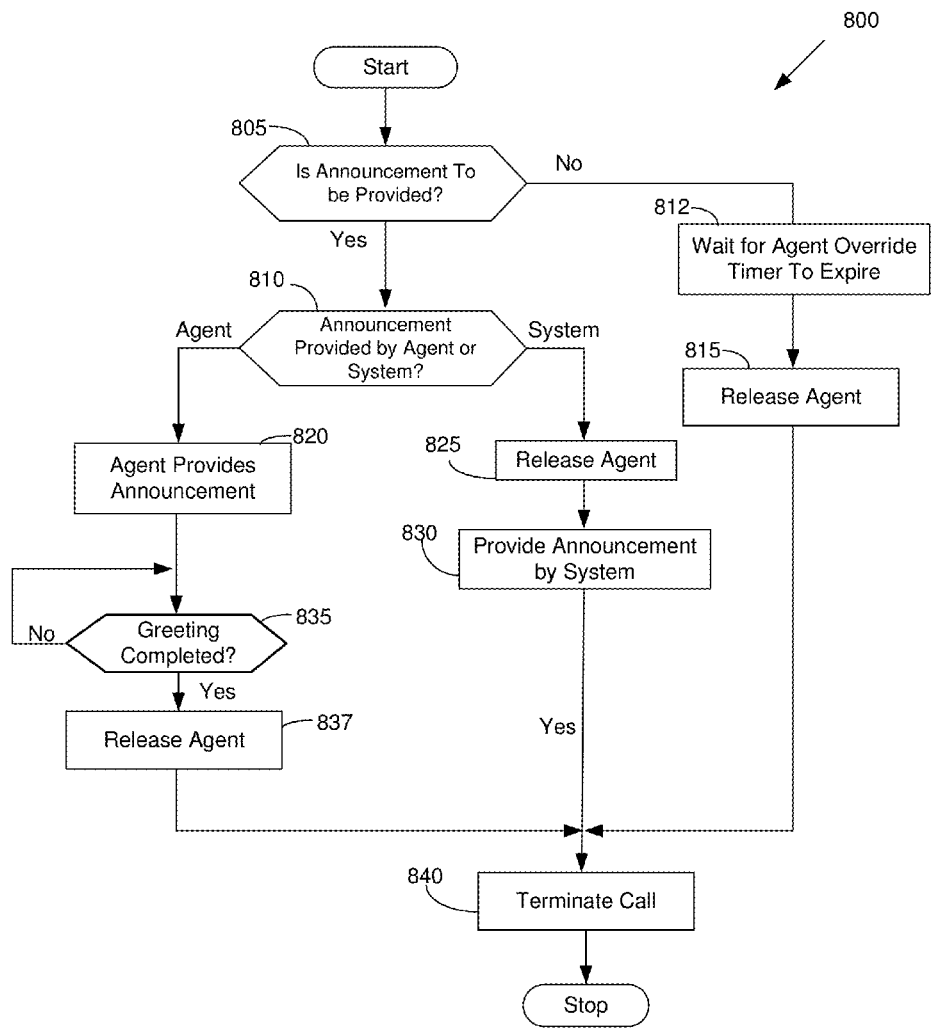
FIG. 8 illustrates one embodiment of a process flow for a dialer to process a call after determining an ACAD has answered the call.

One embodiment of a CAOD process flow 800 is shown in FIG. 8 that summarizes the operations for when the CAOD process encounters an ACAD. This process flow assumes that an ACAD has been reported and presents an alternative illustration of the process flow compared to the earlier figures. A determination may be first made in operation 805 as to whether an announcement is to be provided. In some embodiments, an announcement may be left on the answering machine of the called party. If no announcement is to be provided, then the process flow continues to operation 812 which involves waiting for the agent override timer to expire. The next operation 815 involves releasing the agent from the call. Waiting for the timer to expire is necessary since if the CAOD process made an error and a live person had answered the phone, sufficient time is necessary to allow the agent to potentially override the determination. (This flow is not shown). If no input is received, then the agent may be released from the call. The call is then terminated in operation 840.

If, however, an announcement is to be provided in operation 805, a determination is then made whether the announcement should be provided by the agent or an announcement system in operation 810. In some embodiments, the agent may leave a personalized message on the called party's ACAD. If the agent is to leave a message, the process flow continues to operation 820 where the agent provides their greeting. A test is made in operation 830 to see if the agent has completed their greeting, which may be indicated by the agent selecting an appropriate function key on their workstation. If the greeting is completed in operation 835, then the process flow continues to operation 837 where the agent is released and then to operation 840 where the call is terminated.

If the announcement is provided by an announcement system in operation 810, then the agent can be released from the call in operation 825, the announcement may be provided by an appropriate announcement system in operation 830, and the call may then be terminated in operation 840.

Agent User Interfaces

The agent is presented with a user interface on their computer workstation display that typically provides information about the current known status of a call, including the various reported call answering outcomes. Included is status information as to whether an answered call has been answered by an ACAD or a live person.

Figure 9:
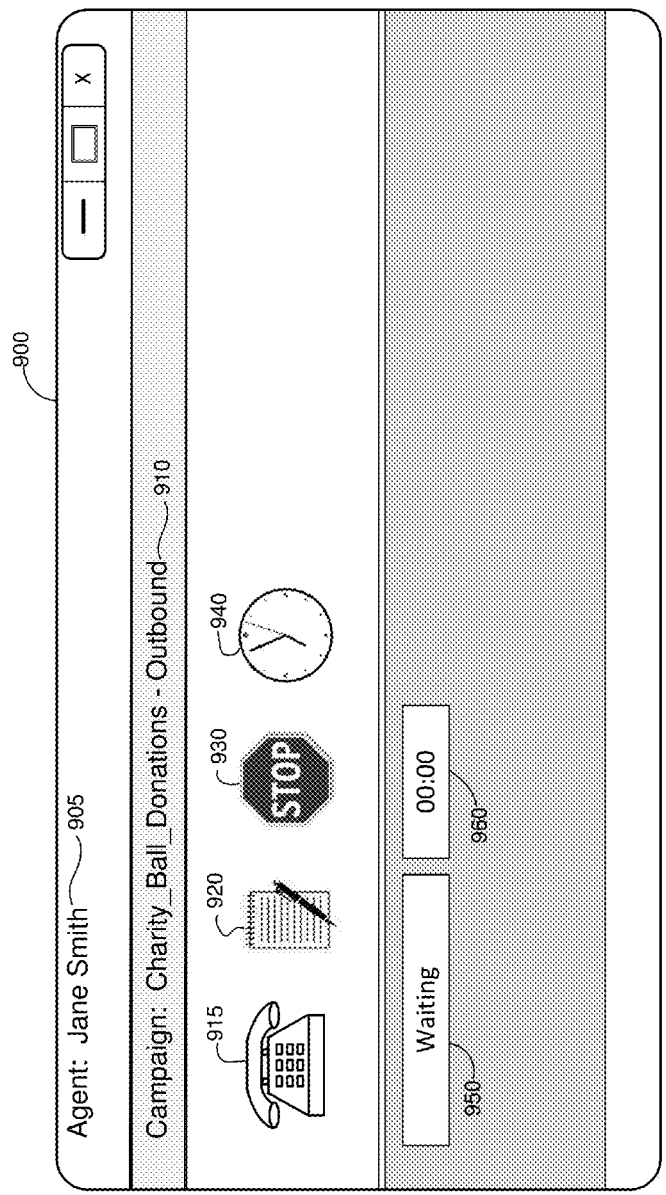
FIGS. 9-11 illustrate various embodiments of a user interface for providing indications to an agent and receiving input from the agent with respect to the call answering outcome of an outgoing call.

Prior to a call being answered, the agent may be presented with a screen image as shown in FIG. 9. There are various embodiments of screen format layouts and functions that may be presented to an agent, and FIG. 9 represents only one format of many possible formats. Because the screen presents information prior to a call being originated, status information about the call is non-existent.

Turning to FIG. 9, the screen 900 provides information about the agent that is currently logged in 905, which in this embodiment is "Jane Smith." Other information may be provided as to the name of the campaign 910, which in this embodiment is "Charity_Ball_Donations—Outbound."

Next, a plurality of icons or functions may be presented to the agent. The phone icon 915 indicates a current call status. In this embodiment, a phone with the handset located on the phone indicates that there is no pending call. A notepad icon 920 may be selected to allow the agent to write notes for a call. A stop icon 930 may be used to allow the agent to log out of the system. A clock icon 940 may provide time and/or shift related information.

Also appearing in another section are text boxes that provide various information. A call status text box 950 indicates a call status, which in this embodiment is "Waiting." This means that the agent is waiting for a call. Consequently, there is no active call that the agent is engaged with. A call duration text box 960 indicates the elapsed time on the call. Since there is no call, the elapsed time is zero. Various other embodiments may display other formats and indicators to an agent.

Figure 10:
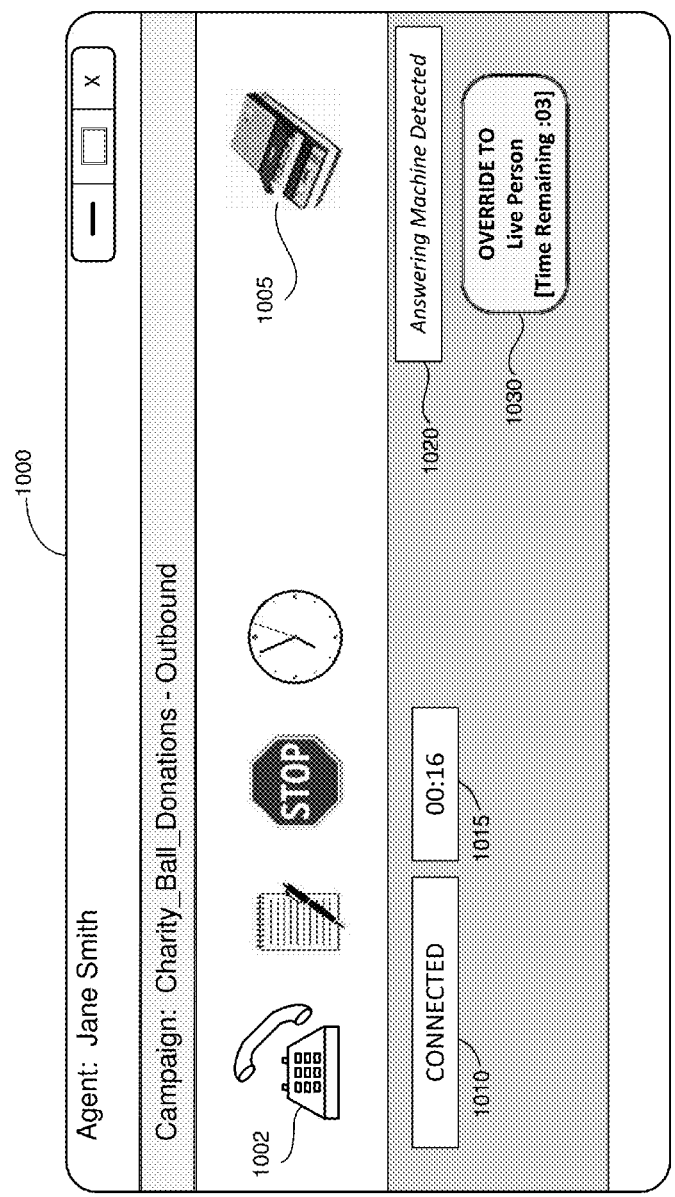

When a call arrives, the agent may be presented with a screen as shown in FIG. 10. Turning to FIG. 10, the screen 1000 is modified in that the phone icon 1002 is now shown with the handset lifted off of the phone, representing that a call is active (e.g., a call has been answered). Similarly, the call status text box 1010 is altered to reflect the current status. In this embodiment, the call has been answered so that the status now says "CONNECTED." Further, the call duration text box 1015 shows the elapsed time of the call, which in this embodiment is sixteen seconds. This may be measured from the origination of the call request or from the connection establishment. The agent is frequently shown information about the number, name, or other account information regarding the call that is connected, but this information is not shown in this embodiment.

In another portion of the screen 1000, another icon is presented. In this embodiment, an answering machine icon 1005 is presented, which signifies that an ACAD has been reported as detected. This is further indicated in another text box 1020, which indicates "Answering Machine Detected." This term may be used in lieu of the term "ACAD" as an agent may readily understand what an "answering machine" is, and further may understand that it encompasses a voice mail service. Thus, the agent may be presented with both symbolic and textual indicators of the reported call answering outcome. In this embodiment, the CAOD process has reported its results, and prior to doing so, the icon 1005 or text box 1020 may be absent or other visual information may be displayed.

In this embodiment, the agent is also presented with an override function 1030. This icon, in the form of a function button, is presented to the agent and may include text indicating that the agent can override the determination of the detected call answering outcome determination. The agent can select the function to indicate that a live person has actually answered the call. In this embodiment, a remaining time is indicated, which represents a countdown of the agent override timer. In this example, the agent has three seconds during which to indicate an override indication. If the agent does nothing, the dialer may drop the agent from the call since an ACAD is detected, and may also terminate the call to the remote party.

Figure 11:
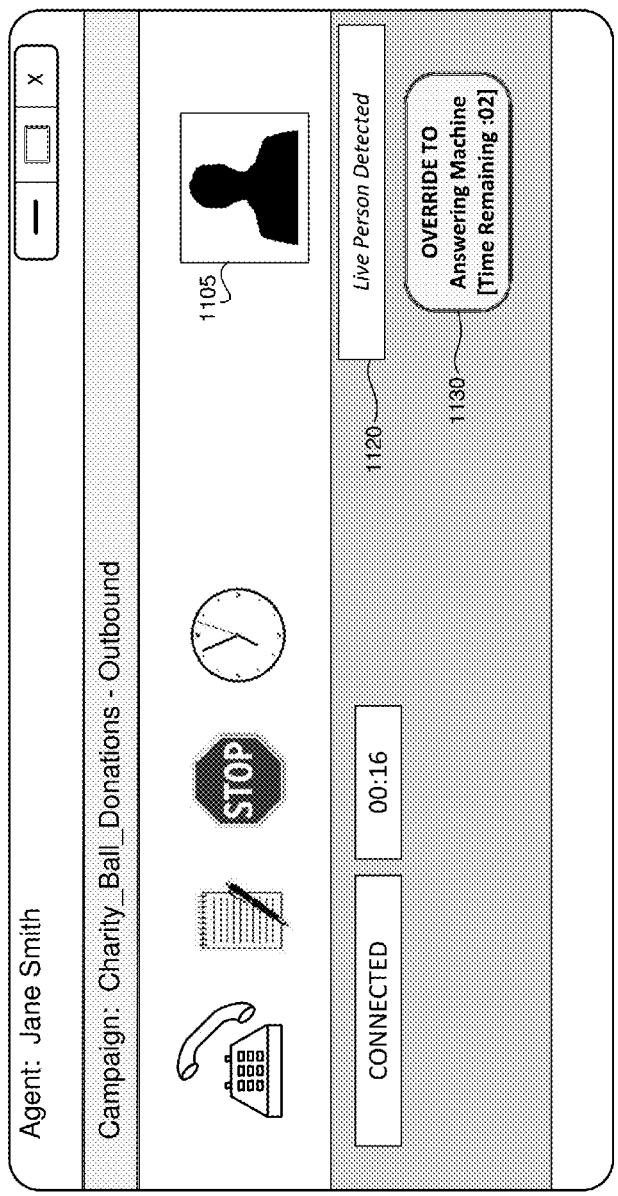

On the other hand, a live person may be reported as having answered the call. In this case, the agent may be a presented with a screen as shown in FIG. 11. Turning to FIG. 11, the screen image is different from that shown in FIG. 10 in that the agent is presented with a live person icon 1105. This icon represents that a live person is reported as having answered the call, as opposed to an ACAD. In addition, the text box 1120 reports that a live person has been detected. Thus, the agent is informed both by an icon and a text box that a live person is reported as having answered the call.

The agent may again override this call answering outcome, and select the function button 1130. This overrides the report of an ACAD answering the call, as opposed to a live person. An agent override timer is also shown. After the timer expires, the function 1130 may be removed from the display. If the agent selects the function button before the timer expires, then the call will be processed as if an ACAD was the call answering outcome.

In the embodiments shown in FIG. 10 and FIG. 11, there is no provision provided for an agent to confirm a result. As noted before, an agent confirming the reported result does not alter the call processing, and hence not all embodiments may allow an agent to confirm a result. In some embodiments, the function key is removed after the override timer expires, which effectively precludes the agent from invoking the function after the expiry of the timer.

The embodiments shown in FIG. 10 and FIG. 11 also do not allow the agent to pre-empt the CAOD process. This is because the function button may be only presented when the call answering outcome is reported. However, in other embodiments the function key could appear as soon as the agent is connected to the originating call. If so, this capability could be accommodated by providing two function keys, one which indicates that the agent reports detecting a live person and another which indicates the agent reports detecting an ACAD answering the call. These buttons may be displayed after the call has been answered (e.g., a connect has occurred). Once the call has been answered and either a live person or ACAD is detected, then one of the function keys could be removed (the button corresponding to appropriate detected entity), so that only the agent override function button remains. In this case, after the CAOD process reports its result, the agent can no longer pre-empt the result, but can only override the result.

OTHER EMBODIMENTS

In the embodiments disclosed above, the agent manually indicates whether to override the results reported by the CAOD process by selecting a function button. In some embodiments, the use case which is of particular concern is when the agent overrides a reported ACAD detection and indicates that a live person was detected. This is to avoid terminating the call to the live person or playing a prerecorded announcement to the live person.

In such situations, the live person may simply answer the phone by saying "hello" and expect the agent to respond. In such situations, the agent will know that a live person has answered the call and may automatically verbally respond but may forget to invoke the override function button. Assuming that the dialer reports that an ACAD has answered the call, then the dialer may terminate the call after the agent override timer expires. Obviously, this would terminate the conversation between the agent and the live person. As mentioned earlier, in some embodiments, this requires the agent override timer to be set for in the range of 1-4 seconds, but the agent may simply forget to respond within this time frame.

In some embodiments, a real time speech analytics ("RTSA") system or other system capable of detecting speech may be conferenced into the call when the call is answered. The RTSA may detect that the agent is speaking in response to the greeting provided by the live person. In such instances, the RTSA system may presume that the agent is speaking because a live person was detected. In other words, the RTSA system (or other speech related processing system) may signal to the dialer that the agent is implicitly overriding the determination of the CAOD process results based on the agent's conversing with the live party. Typically, it would be unusual for the agent to normally speak unless there was a live person answering the call. Using such a RTSA system would avoid the agent from having to select a function key to override the result determination, and allow the agent to do so by merely speaking to the live person.

In another embodiment, a confidence score may be returned along with the determination of the indication of whether a live person or ACAD answered the call. This confidence score may be used by the CAOD process in various ways. One way is for the CAOD process to present the function buttons to the agent allowing to the agent to override the reported result only if the confidence score was less than a threshold. For example, if the confidence score indicates that a 99% level of certainty is associated with the reported outcome (e.g., that a live person has answered the call), then the processing may be altered such that no override functions can be invoked by the agent. The particular threshold may be set by the system administrator. In other embodiments, the value of the confidence level within a certain range may be the basis for presenting functions buttons to the agent to confirm the reported result. In other embodiments, the confidence level score may be also presented to the agent along with the various described function buttons.

Figure 12:
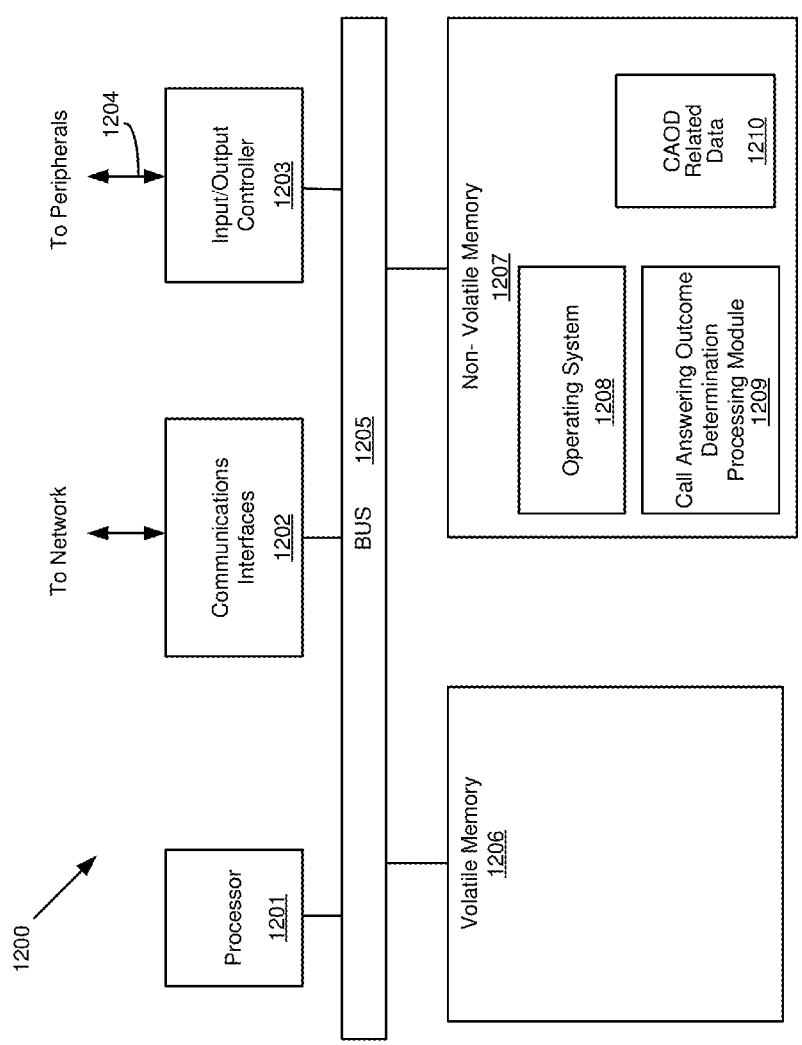
FIG. 12 illustrates one embodiment of a processing system used to implement the concepts and technologies disclosed herein.

FIG. 12—Exemplary Computer Processing Device

As discussed earlier, there may be a number of distinct computer-based processing devices in various embodiments of the present invention, which execute modules for various purposes. For example, there may be an application specific computer processing device for processing call outcome determinations or call answering outcome determinations. This module may generate the data in the logs, or used by the wallboard elements reflecting the accuracy of the CAOD process. In other embodiments, these processing devices and/or modules may be combined or distributed on various components. In some embodiments, the functionality of the modules performing the functions described herein may be integrated into a single component.

As shown in FIG. 12, the processing system 1200 may include one or more processors 1201 that may communicate with other elements within the processing system 1200 via a bus 1205 or some other form of communication facility. The processor 1201 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, Von Neumann based computer processing architecture, other circuitry, or the like.

In one embodiment, the processing system 1200 may also include one or more communications interfaces 1202 for communicating data via the local network, voice service provider, PSTN, or with various external devices. In various embodiments, the communication facility may be via wired, optical, or wireless networks (or a combination thereof). The communication may use a variety of data transmission protocols, such as fiber distributed data interface (FDDI), Ethernet, asynchronous transfer mode ("ATM"), or frame relay. The communications facilities may include any technology used to provide, e.g., ISDN interfaces. Although the interface may be an ISDN PRI interface, in other embodiments, a SIP or other VoIP interface could be used.

The input/output controller 1203 may also communicate with one or more input devices or peripherals using an interface 1204, such as, but not limited to: a keyboard, a mouse, a touch screen/display input, microphone, pointing device, etc. The input/output controller 1203 may also communicate with output devices or peripherals, such as displays, printers, speakers, headsets, banner displays, other components in the contact center, etc. These may be used, in part, to receive data, such as contact lists or profile data retrieved from an external database.

The processor 1201 may be configured to execute instructions stored in volatile memory 1206, non-volatile memory 1207, or other forms of computer readable storage media accessible to the processor 1201. The volatile memory may comprise various types of memory technologies, including, but not limited to: random access memory ("RAM"), dynamic random access memory ("DRAM"), static random access memory ("SRAM"), and other forms well known to those skilled in the art. The non-volatile memory may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 1207 may store program code and data, which also may be loaded into the volatile memory 1206 at execution time. Specifically, the non-volatile memory 1207 may store the CAOD processing module 1209 that may perform any of the above mentioned process flows, functions, or capabilities. Non-volatile memory may also store operating system code 1208 containing instructions for performing the process and/or functions associated with the technologies disclosed herein. The CAOD processing module 1209 may also access the various call answering outcome data 1210 previously disclosed. The volatile memory 1206 and/or non-volatile memory 1207 may be used to store other information including, but not limited to: records, applications, programs, scripts, source code, object code, byte code, compiled code, interpreted code, machine code, executable instructions, cause codes, call logs, summary call attempt statistics, or the like. These may be executed or processed by, for example, processor 1201. These may form a part of, or may interact with, the CAOD processing module 1209. In some embodiments, the CAOD processing module 1209 may be integrated in another component identified previously. Thus, it is possible for the CAOD processing module to be integrated into the dialer, into another piece of equipment, or distributed over the dialer and other pieces of equipment.

The technologies described herein may be implemented in various ways, including as computer program products comprising memory storing instructions causing a processor to perform the operations associated with the above technologies. The computer program product comprises a non-transitory computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer readable storage media include all the above identified computer readable media (including volatile and non-volatile media), but does not include a transitory, propagating signal, nor does it encompass a non-tangible computer readable medium. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or the like. Non-volatile computer readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, except for the terms in the glossary, they are used in a generic and descriptive sense only and not for purposes of limitation.

The invention claimed is:

1. A system in a contact center comprising:
a telephone dialer comprising a processor configured to:
   determine an agent from among a plurality of agents is available to accept a call;
   based on determining the agent is available to accept the call, originate the call to a telephone number;
   connect the agent to the call;
   ascertain an automatic call answering device ("ACAD") has answered the call;
   start a timer in response to ascertaining the ACAD answered the call;
   provide a visual indication to a computer for display to the agent indicating that the ACAD has answered the call; and
   terminate the call to the agent in response to not receiving an agent override indication from the computer prior to expiry of the timer.

2. The system of claim 1, wherein the telephone dialer is configured after terminating the call to the agent:
select a second telephone number;
originate a second call using the second telephone number;
ascertain the agent is available to accept the second call;
connect the agent to the second call;
ascertain another automatic call answering device ("ACAD") has not answered the second call;
start a second timer in response to ascertaining the another ACAD has not answered the second call;
provide a second visual indication to the computer for display to the agent indicating that the another ACAD has not answered the second call; and
maintain the second call to the agent in response to not receiving an agent override indication from the computer prior to expiry of the second timer.

3. The system of claim 1, wherein the processor is further configured to:
provide the visual indication as an icon displayed on the computer; and
receive an agent selection of the icon as the agent override indication.

4. The system of claim 1, wherein the processor is further configured to:
terminate the call to the agent in response to receiving a confirmation from the agent indicating the ACAD has answered the call.

5. The system of claim 1, wherein the processor is further configured to:
after determining an agent from among the plurality of agents is available to accept the call, providing account information associated with the telephone number for display on the computer.

6. The system of claim 1, wherein the processor is further configured to:
record a flag reflecting that the call to the telephone number was answered.

7. A non-transitory computer readable medium storing instructions that when executed by a processor cause the processor to:
determine an agent from among a plurality of agents is available to accept a call;
based on determining the agent is available to accept the call, originate the call to a telephone number;
connect the agent to the call;
ascertain an automatic call answering device ("ACAD") has answered the call;
start a timer in response to ascertaining the ACAD answered the call;
provide a visual indication to a computer for display to the agent indicating that the ACAD has answered the call; and
terminate the call to the agent in response to not receiving an agent override indication from the computer prior to expiry of the timer.

8. The non-transitory computer readable medium of claim 7,
select a second telephone number;
originate a second call using the second telephone number;
ascertain the agent is available to accept the second call;
connect the agent to the second call;
ascertain another automatic call answering device ("ACAD") has not answered the second call;
start a second timer in response to ascertaining the another ACAD has not answered the second call;
provide a second visual indication to the computer for display to the agent indicating that the another ACAD has not answered the second call; and
maintain the second call to the agent in response to not receiving an agent override indication from the computer prior to expiry of the second timer.

9. The non-transitory computer readable medium of claim 7, wherein the instructions cause the processor to:
provide a visual indication to a computer for display to the agent indicating that the ACAD has answered the call in response to detecting the ACAD has answered the call.

10. The non-transitory computer readable medium of claim 7, wherein the ACAD is a voice mail system.

11. The non-transitory computer readable medium of claim 7, wherein the instructions further cause the processor to:
provide the visual indication as an icon to the computer for display to the agent; and
receive an agent selection of the icon as the agent override indication.

12. The non-transitory computer readable medium of claim 7, further comprising instructions that cause the processor to:
maintain the call to the agent in response to receiving an agent override indication from the computer prior to expiry of the timer.

13. The non-transitory computer readable medium of claim 12, further comprising instructions that cause the processor to:
record an indication of the agent override indication along with an identifier of the call.

14. A method for processing a call with an agent, comprising:
determine by a dialer an agent from among a plurality of agents is available to accept a call;
based on determining the agent is available to accept the call, originate the call by the dialer to a telephone number;
connect the agent to the call by the dialer;
ascertain by the dialer an automatic call answering device ("ACAD") has answered the call;
start a timer by the dialer in response to ascertaining the ACAD answered the call;

provide a visual indication to a computer for display to the agent by the dialer, the visual indication indicating that the ACAD has answered the call; and terminate the call to the agent by the dialer in response to not receiving an agent override indication from the computer prior to expiry of the timer.

15. The method of claim 14 further comprising:

selecting a second telephone number;

originating a second call using the second telephone number;

ascertaining the agent is available to accept the second call;

connecting the agent to the second call;

ascertaining another automatic call answering device ("ACAD") has not answered the second call;

starting a second timer in response to ascertaining the another ACAD has not answered the second call;

providing a second visual indication to the computer for display to the agent indicating that the another ACAD has not answered the second call; and maintaining the second call to the agent in response to not receiving an agent override indication from the computer prior to expiry of the second timer.

16. The method of claim 14 further comprising:

maintaining the call to the agent in response to receiving an agent override indication from the computer prior to expiry of the timer.

17. The method of claim 14 further comprising:

recording an indication reflecting that the call to the telephone number was answered by the ACAD.

18. The method of claim 14 further comprising:

recording an indication reflecting that the call to the telephone number was answered by the ACAD.

19. The method of claim 14, further comprising:

displaying a real-time value of the timer to the agent on the computer.

* * * * *